(12) United States Patent
Garber et al.

(10) Patent No.: US 7,988,055 B2
(45) Date of Patent: Aug. 2, 2011

(54) UNCONTROLLED PASSIVE RADIO FREQUENCY IDENTIFICATION TAG AND SYSTEM WITH 3-D POSITIONING

(75) Inventors: Fred Garber, Brookville, OH (US); Brian Rigling, Dayton, OH (US)

(73) Assignee: Wright State University, Dayton, OH (US)

( * ) Notice: Subject to any disclaimer, the term of this patent is extended or adjusted under 35 U.S.C. 154(b) by 400 days.

(21) Appl. No.: 11/336,622

(22) Filed: Jan. 20, 2006

(65) Prior Publication Data

US 2006/0158333 A1 Jul. 20, 2006

Related U.S. Application Data

(60) Provisional application No. 60/645,273, filed on Jan. 20, 2005.

(51) Int. Cl.
*G06K 19/06* (2006.01)
(52) U.S. Cl. ....................................... 235/492
(58) Field of Classification Search .......... 235/375–385, 235/492; 340/10.1–10.6, 572.1–572.9
See application file for complete search history.

(56) References Cited

U.S. PATENT DOCUMENTS

| 4,075,632 | A | | 2/1978 | Baldwin et al. |
| 5,164,985 | A | * | 11/1992 | Nysen et al. ............... 380/271 |
| 5,446,447 | A | * | 8/1995 | Carney et al. ............. 340/572.4 |
| 5,742,237 | A | * | 4/1998 | Bledsoe .................. 340/825.49 |
| 5,920,261 | A | * | 7/1999 | Hughes et al. ............. 340/568.8 |
| 5,966,083 | A | * | 10/1999 | Marsh et al. ............... 340/10.42 |
| 5,971,587 | A | * | 10/1999 | Kato et al. ..................... 700/115 |
| 6,813,498 | B1 | * | 11/2004 | Durga et al. ............... 455/456.1 |
| 6,995,655 | B2 | * | 2/2006 | Ertin et al. .................... 340/10.2 |
| 7,023,342 | B2 | * | 4/2006 | Corbett et al. ............. 340/572.1 |
| 7,265,675 | B1 | * | 9/2007 | Carrender et al. ......... 340/572.7 |
| 2005/0212660 | A1 | | 9/2005 | Hansen et al. |
| 2006/0001543 | A1 | | 1/2006 | Raskar et al. |

* cited by examiner

*Primary Examiner* — Jamara A Franklin
(74) *Attorney, Agent, or Firm* — Connolly Bove Lodge & Hutz LLP

(57) ABSTRACT

Passive radio frequency identification tags comprising a simple antenna and a circuit with a unique frequency-dependent response, in place of an RF-powered integrated circuit with control logic, is disclosed. The unique frequency-dependence of the circuit, which may simply be a feature of the antenna, conveys the tags identification. Multiple frequency-dependent circuit RFID tags can be simultaneously identified and located in 3-D space through use of antenna arrays and sampling at multiple frequencies in order to provide spatial resolution.

21 Claims, 3 Drawing Sheets

$$SNR = \frac{EIRP \cdot A_r A_t G_r \rho_{eff} \rho_{ID} T}{(4\pi)^2 R^4 k T_0 F_n L}$$

- Tag ant., 140cm²
- 4W
- Reader ant., 24"x12"
- Tag dipole., 2.14 dB
- Circuit efficiency & ID separation, 1%
- Coherent integration time, 2ms
- Effective SNR in feature space = 14.8 dB
- System losses, 2 dB
- Noise figure, 0.5 dB
- Room temp., 290K
- Boltzmann's const, 1.38×10⁻²³ J/deg
- Read range, 100m

FIG. 3

UNCONTROLLED PASSIVE RADIO FREQUENCY IDENTIFICATION TAG AND SYSTEM WITH 3-D POSITIONING

CROSS REFERENCE TO RELATED APPLICATIONS

This application claims the benefit of U.S. Provisional Application No. 60/645,273 filed Jan. 20, 2005, which is incorporated herein by reference.

FIELD OF THE INVENTION

The present invention relates generally to radio frequency identification tags, and more particularly to passive radio frequency identification tags and system thereof.

BACKGROUND OF THE INVENTION

Radio Frequency Identification ("RFID") is a generic term for technologies that use radio waves to automatically identify individual items. Objects can be identified using RFID by storing a serial number that identifies the object on a chip that is attached to an antenna. The chip and the antenna together are called an RFID tag. An RFID reader sends out electromagnetic waves that are received by the antenna on the RFID tag. Passive RFID tags draw power from this electromagnetic field to power the chip. Active tags use their own batteries to power the chip. There is also a version of a passive tag that does contain a battery, and is referred to as an "active/passive" tag. This tag has some of the attributes of a true active tag, but communicates in the same manner as a passive tag.

RFID tags can also be distinguished by their memory type. Read/write memory, can be read as well as written into such that its data can be dynamically altered. Read only (typically "chipless") type of tag memory is factory programmed and cannot be altered after the manufacturing process. According, the data of the RFID tag is static.

A typical passive RFID tag is shown by FIG. 1, and generally indicated by symbol 10. The RFID tag comprises an antenna circuit 20 and an integrated circuit 30. The integrated circuit 30 may include an RF (or AC) rectifier 40 that converts RF (or AC) voltage to DC voltage, a modulation circuit 50 that is used to transmit stored data to a tag reader, a demodulation circuit 60 that is used to receive data from the tag reader, a memory circuit 70 that stores information, a logic circuit 80 that controls overall function of the device, etc. The antenna circuit 20 for a typical RFID tag may be formed by a parallel resonant LC circuit, where L is inductance and C is capacitance.

When radio waves from a tag reader are encountered by the passive RFID tag 10, the antenna circuit 20 within the tag forms a magnetic field. The integrated circuit 30 draws power from the antenna, via the rectifier 40, energizing the circuits in the tag. The integrated circuit 30 uses that energy to transmit response codes by modulating the impedance the antenna circuit 20 presents to the interrogating field, thereby modulating the signal reflected back to the a tag reader antenna. Typical tag readers obtain a tag's ID information by requesting one bit at a time. The integrated circuit 30 on the tag processes signals from the tag reader to learn what bit is requested, and then sets backscatter modulation in order to respond with the requested bit. The integrated circuit 30 also provides control logic that allows tag readers to illuminate and communicate with multiple tags within its transmitted field. Without control logic, all illuminated tags would respond to queries from the tag reader simultaneously and cause interference with one another. Proper control logic and communication algorithms/protocols solve this multiple-tag collision problem. Unfortunately, the power requirements of the integrated circuit 30 largely drives the read range performance of passive RFID tags. Reading range is defined as the communication operating distance between the reader and tag. The reading range of a typical RFID tag may be less than ten meters, which is a significant limiting factor of passive RFID applications. Accordingly, improvements in passive RFID technologies are still needed.

SUMMARY OF THE INVENTION

It is against the above background that present invention in one embodiment provides a passive radio frequency identification tag comprising a simple antenna and a circuit with a unique frequency-dependent response, in place of an RF-powered integrated circuit with control logic. Eliminating the power requirements of an integrated circuit greatly increases the effective reading range of the passive tag according to the present invention. In addition, the unique frequency-dependence of the circuit, which may simply be a feature of the antenna, conveys the tags identification, and may comprise linear elements and nonlinear elements to provide a nonlinear response. As a nonlinear response is easier to separate from a cluttered environment of mainly linear responses, multiple RFID tags according to the present invention can be simultaneously identified and located in 3-D space through the use of antenna arrays and sampling at multiple frequencies in order to provide spatial resolution. Accordingly, it is to be appreciated that the present invention in another embodiment provides an improved passive RFID tag system that permits multiple frequency-dependent circuit RFID tags to be simultaneously identified and located in a 3-D space, and also allow environmental clutter (e.g., nearby metal objects) to be spatially separated and segmented.

These and other features and advantages of the invention will be more fully understood for the following detailed description of the invention taking together with the accompanying drawings. It is noted that the scope of the claims is defined by the recitations therein and not by the specific discussion of features and advantages set forth in the present description.

BRIEF DESCRIPTION OF THE DRAWINGS

The following description of the embodiments of the present invention can be best understood when read in conjunction with the following drawings, where like structure is indicated with like reference numerals and in which:

FIG. 3 is a simple link budget analysis for the present invention.

Skilled artisans appreciate that elements in the figures are illustrated for simplicity and clarity and have not necessarily been drawn to scale. For example, the dimensions of some of the elements in the figures may be exaggerated relative to other elements, and with conventional parts removed, to help to improve understanding of embodiments of the present invention.

DETAILED DESCRIPTION OF THE INVENTION

Figure 2:
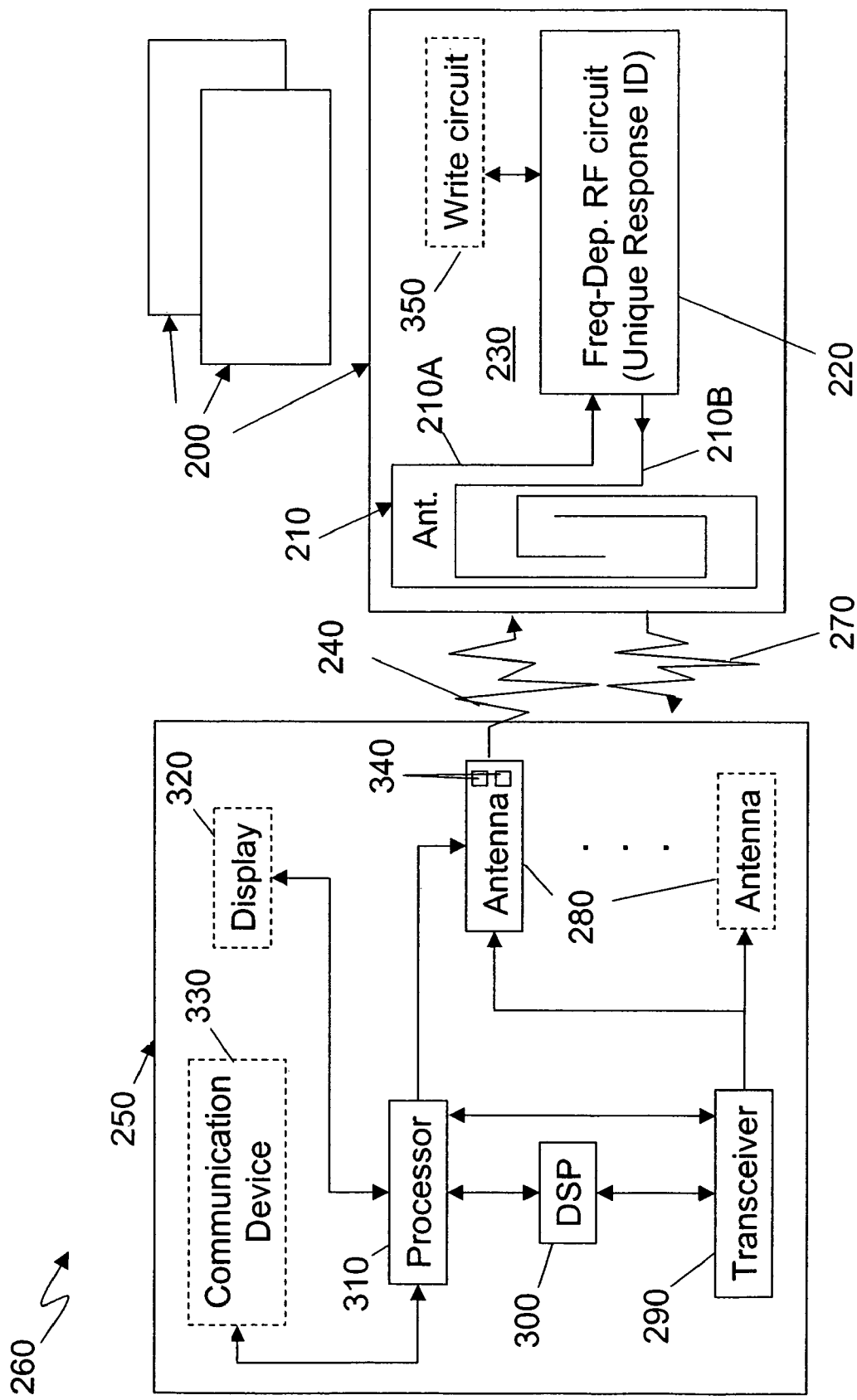
FIG. 2 is a frequency-dependent circuit passive RFID tag according to the present invention that does not depend on IC control logic to solve the collision problem.

A plurality of simplified frequency-dependent circuit passive radio frequency identification (pRFID) tags in according to one illustrative embodiment of the present invention is shown generally by symbol 200 in FIG. 2. Each of the PFRID tags 200 comprises an antenna circuit 210 and each have a unique frequency-dependent circuit 220. In one embodiment, the antenna circuit 210 and frequency-dependent circuit 220 are implemented on a substrate 230. In one embodiment, the substrate 230 is formed from silicon, a fibrous material, such as paper or cloth, plastic, or other inexpensive material, and combinations thereof. The antenna circuit 210 is formed as a pattern, such as for example, of two spaced apart deposits of conductive material as shown in FIG. 2. The conductive materials include metals, carbon ink, carbon filled polymer, or other suitable conductive materials. The conductive pattern may be printed, painted, or otherwise disposed on the substrate 230. In one embodiment, the antenna circuit 210 includes a receiving antenna array 210A and a transmitting antenna array 210B.

It is to be appreciated that many methods for antenna and frequency-dependent circuit design are presently available. In one embodiment, the antenna pattern itself functions as the frequency-dependent circuit 220. In another embodiment, the frequency-dependent circuit 220 may be similarly formed of conductive materials or separately prepared, such as by using a standard manufacturing process, and electrically coupled to the antenna circuit 210. Therefore, it is to be appreciated that the present invention is not specific to any particular antenna design and/or circuit design. Rather, it is the combination of these elements that is innovative, and in practice, the antenna design and/or circuit design will vary significantly depending the application of interest.

The frequency-dependent circuit 220 of each of the tags 200 is designed to have a unique response for each frequency within its specified spectrum that is used to provided identification and other data. The term "response" means, in the context of the present invention, that each of the tags 200 provides intelligible information when subjected to an appropriate interrogation signal 240, such as from a RFID tag reader, which is indicated generally by symbol 250 in FIG. 2. Together, tags 200 and tag reader 250 provide one illustrative embodiment of a RFID system according to the present invention, which is illustrated generally by symbol 260.

When one of the tags 200 is illuminated by a particular frequency of RF energy, i.e. interrogation signal 240, it responds at that frequency with a signal 270 having a unique phase and/or amplitude. This frequency dependent response, i.e. signal 270, is received by an antenna system 280 of the RFID tag reader 250.

As shown in FIG. 2, the tag reader 250 includes the antenna system 280, a radio frequency transceiver 290, a digital signal processor (DSP) 300, a control processor 310. It should be noted the RFID tag reader 250 shown in FIG. 2 can include other components, such as a display or user control 320, and a communication device 330 for communicating data over a wired and/or wireless network (e.g. Ethernet, Power Over Ethernet, Bluetooth, infra-red, RF wireless LAN, etc.), such as to a network computer and/or other tag readers. In addition, the RFID tag reader 250 can include other components not shown, such as an internal and/or external power source which supplies the necessary power to the reader for proper operation such that the RFID tags 200 are located and identified within a specified space.

In one illustrated embodiment, the antenna system 280 of the tag reader 250 is coupled to the transceiver 290, which in turn is coupled to the DSP 300, and the DSP is coupled to the control processor 310. In one embodiment, the control processor 310 may be coupled to the DSP 300, the transceiver 290, and antenna system 280 for control and mode switching. It is to be appreciated that the transceiver 290 may also be in one embodiment separated into individual transmitter and receiver devices.

The antenna system 280 may be one or a plurality of conventional antenna array structures separated by known distances. In one embodiment, the tag reader 250 transmits and receives RF electromagnetic radiation signals 240, 270 utilizing the antenna system 280, as shown in FIG. 2. In one embodiment, one of the antennas 280 serves as the transmitting antenna and the other remaining antennas serve as the receiving antennas to provide angular signal separation. Such angular signal separation is analyzed by the processor 310 to provide location of the tags 200 in a space. In addition, the given responses by the tags 200 at multiple frequencies permits the control processor 310 to decode the responses and relate each of the given locations of the tags 200 to a unique tag ID.

The control processor 310 operates to synchronize the components of the tag reader 250 to ensure effective operation. In one embodiment, the control processor 310 is networked to communicate and be RF phase synchronous with a plurality of tag readers 250 such that information on separate perspectives of a common scanned area can be analyzed as an aggregate image. It is contemplated that one or more tag readers 250 in the plurality can transmit the RF signals 240 simultaneously or non-simultaneously. It is also contemplated, as well, that one or more tag readers 250 can receive the reflected signals 270 from the RFID tags 200 simultaneously or non-simultaneously. These methods of cooperative signal processing provide the basis for a plurality of image perspectives and thereby can create an image of the scanned area showing the locations of the tags 200 from different perspectives.

In one embodiment, the frequency-dependent circuit 220 provides a linear radio frequency response, and in another embodiment a linear and a non-linear radio frequency response. As used herein, a "linear radio frequency response" means that there is a linear relationship between stimulus and response where an increase in stimulus will result in a corresponding increase in response, and vice versa. A "non-linear radio frequency response" means that there is not a linear relationship between stimulus and response where an increase in stimulus will necessarily result in a corresponding increase in response, and vice versa. Since the ability to provide a circuit with a frequency-dependent response or a linear/nonlinear response is well within the skill of those in the related art, no further details about the same are provided. In one embodiment, the responses 270 of the tags 200 are statistically orthogonal to each other. In still another embodiments, in order to maintain signal strength, the responses 270 of the tags 200 vary in phase as a function of frequency.

Figure 1:
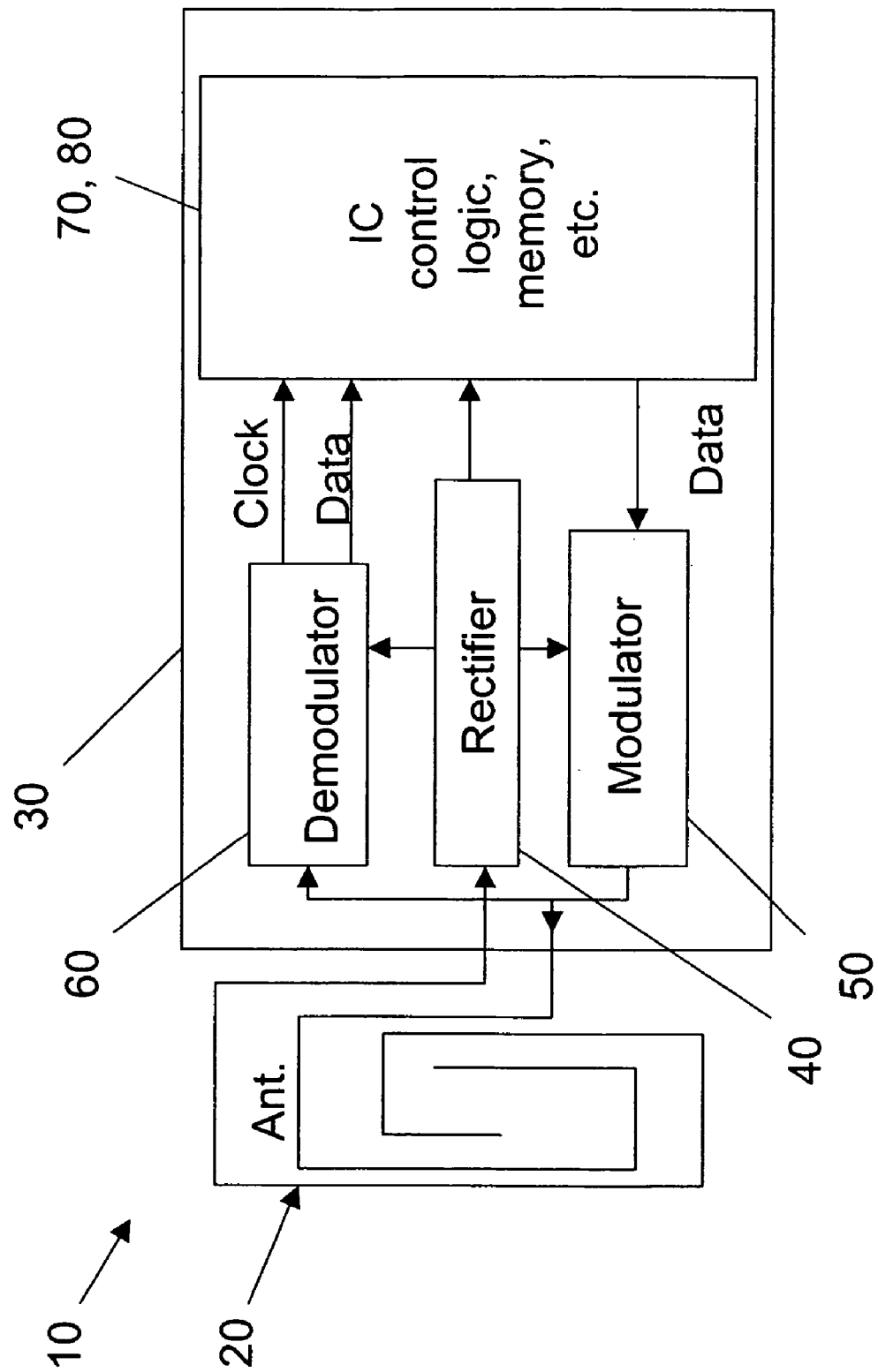
FIG. 1 is a prior art passive RFID tag that is powered by a rectifier/voltage converter which siphons off a significant portion of the RF energy captured by the antenna circuit of the tag.

In the latter of the above embodiments, when the tags 200 are illuminated by a particular frequency of RF energy, each of the tags 200 will return a unique linear/nonlinear response. Each unique linear/nonlinear response is observed by the RFID reader 250, and given responses at multiple excitations frequencies, a series of measurements can be decoded and related to a particular tag ID. However, unlike the typical pRFID tag design shown by FIG. 1, in the above illustrative embodiments of FIG. 2, there is no control logic to prevent all of the illuminated tags from replying simultaneously. For this reason, the use of multiple reader antennas 280 or tag readers 250 provide the geometric diversity necessary to spatially resolve the responses 270 from the plurality of tags 200.

Spatially resolving the tags 200 allows the unique identifications of each to be determined, and also provides 3-D position information for each tag. Resolving tags in 3-D also allows in one embodiment for the processor 310 to computationally spatially separate and segment environmental clutter (e.g., nearby metal objects) from the detection space. In addition, eliminating the power-consuming IC frees up considerable energy to be backscattered to the tag reader 250.

An analysis, shown in FIG. 3, suggests that an order of magnitude improvement in range performance in the disclosed embodiments of the present invention is provided. In particular, FIG. 3 is a simple link budget analysis which indicates that tags 200 according to the present invention offer operating ranges up to 100 m, which is significantly in excess of the advertised ranges (<10 m) of prior art passive RFID tags.

The analysis presented hereinafter illustrates the primary functionality of a pRFID system 260 according to the present invention. As mentioned above, the pRFID system 260 comprises a plurality of the frequency-dependent circuit pRFID tags 200 and at least one tag reader 250. Each of the tags 200 has a unique spectral response over a range of operating/excitation frequencies, such that response of the $k^{th}$ tag to the $p^{th}$ frequency is $H_k(f_p)$. One may choose to exploit all or only a subset of these frequencies (e.g., P of them) at any given instance. In another embodiment, in addition to each tag having a unique spectral response, all the tags 200 may also have an identical response at a given frequency or frequencies in order to provide a known reference.

The tag reader 250 includes a multiple (N) of antennas elements 340 in each antenna system 280 that are geometrically separated. The precise configuration of antenna elements 340 will vary based on the application. Techniques for designing and fabricating antennas are also well-known. Through monostatic, bistatic or multistatic operation, each antenna system 280 will interrogate each illuminated tag at every frequency of interest. If multiple (M) tags 200 lie within the illuminated region, their recorded returns will consist of a superposition of tag responses. Thus, the spectral response observed by the $q^{th}$ antenna at the $p^{th}$ frequency will be according to Equation (1).

$$S_q(f_p) = \sum_{k=1}^{M} A_{qk} H_k(f_p) \exp\left(-j \frac{2\Pi f_p}{c} R_{qk}\right) \quad (1)$$

where $A_{qk}$ is an arbitrary gain/phase related to the physical channel between the tag and reader. The round-trip range (monostatic or bistatic) from the transmitter to the tag to the receiver is $R_{qk}$, is thus a function of the known transmitter position $t_q$, the known receiver position $r_q$, and the unknown tag position $x_k$. In monostatic operation, the transmitter and receiver are collocated. The measurements represented by Equation (1) will be repeated for all antennas (for all q) and for all frequencies (for all p).

One may then spatially resolve the M tags and obtain their identification codes through appropriate signal processing. In addition, significant work has already been done in 3-D RF imaging and extraction of RF phenomenology. Many algorithms exist for spatially resolving unique signatures such as those returned by the suggested pRFID tags. The goal is to estimate the tag positions $(x_k, y_k, z_k)$ and/or their frequency-dependent responses $\hat{H}_k(f_p)$. This may be done parametrically. As mentioned earlier, many algorithms already exist to solve this problem. Many more algorithms are under development under different auspices. And, the specific algorithm that should be applied will vary on a case-by-case basis.

Given estimates for tag positions and frequency-dependent responses, the estimated responses $\hat{H}_k(f_p)$ may be related back to tag identification numbers that are stored in an electronic database. The system may then supply the operator with a report that conveys the 3-D position and/or identification information associated with every tag that lies within the processed region.

It is to be appreciated that the present invention is in one embodiment is an IC-less passive RFID tag, thereby providing a two way communication system with extreme power limitations on one end. One of the benefits is such a system permits the anti-collision algorithm to be implemented. In an alternate implementation, the pRFID tag embodiments of FIG. 2 could include an additional integrated circuit (IC) 350 to allow writing operations at short range. During a write operation, the IC would be RF-powered and would alter the frequency-dependent circuit or the linear/nonlinear circuit as directed by the tag reader 250. Read operations could be conducted at longer ranges using the general process described above.

The present invention is suitable for personnel locating/tracking/monitoring and a variety of material handling functions that require product ID codes such as UPC symbols. These include product tracking, sorting systems, conveyor systems, baggage handlers, etc. Military applications include locating/tracking/monitoring of friendly forces, tracking of weapons and munitions, cooperative targeting, and the like are also envision applications of the present invention.

While the invention has been described by reference to certain preferred embodiments, it should be understood that numerous changes could be made within the spirit and scope of the inventive concepts described. Accordingly, it is intended that the invention not be limited to the disclosed embodiments, but that is have the full scope permitted by the language of the following claims.

What is claimed is:

1. A passive radio frequency (RF) identification (pRFID) tag comprising:
    at least one frequency-dependent circuit configured to provide a unique frequency-dependent response to be transmitted at least one predetermined frequency in response to receiving said at least one predetermined frequency, wherein the frequency-dependence of the response conveys the tag's identification, and wherein provision of the unique frequency-dependent response is not performed under the control of control logic.

2. The tag according to claim 1, wherein said response comprises a response selected from the group consisting of: a unique phase, a unique amplitude, and combinations thereof.

3. The tag of claim 1, wherein at least one said frequency-dependent circuit is to provide a unique response selected from the group consisting of: a linear RF response, a non-linear response, and a combined linear and non-linear response.

4. The tag of claim 1, wherein said response is a spectral response over a range of operating/excitation frequencies and exploits at least one of the operating/excitation frequencies at any given instance.

5. The tag of claim 1, wherein in addition to said unique response, said tag has a response at a given frequency or frequencies identical to a response from a plurality of said tags in order to provide a known reference.

6. The tag of claim 1, further comprising:
an integrated circuit to allow writing operations at short range to alter operation of at least one said frequency-dependent circuit.

7. The tag of claim 1, wherein said tag has an operating range up to about 100 m away from an RFID reader.

8. The tag of claim 1, further comprising:
at least one antenna coupled to said at least one frequency-dependent circuit to perform at least one function selected from the group consisting of: receiving said one or more predetermined frequencies and transmitting said response.

9. The tag of claim 8, wherein said at least one antenna comprises an antenna array.

10. The tag of claim 8, wherein said at least one antenna comprises at least one pattern of conductive material on a substrate on which said tag is formed.

11. The tag of claim 1 or claim 8, wherein said tag further comprises a substrate on which said tag is formed.

12. The tag of claim 11, wherein said substrate comprises at least one substance selected from the group consisting of: silicon, a fibrous material, and plastic.

13. The tag of claim 1, wherein said at least one frequency-dependent circuit comprises at least one frequency-dependent antenna.

14. A radio frequency identification (RFID) tag system comprising:
a passive radio frequency (RF) identification (pRFID) tag comprising at least one frequency-dependent circuit configured to provide a unique frequency-dependent response to be transmitted at least one predetermined frequency in response to receiving said at least one predetermined frequency, wherein frequency-dependence of the response conveys the tag's identification, and wherein provision of the unique frequency-dependent response is not performed under the control of control logic; and
an RFID reader configured to illuminate said tag with RF energy, observe one or more responses at said at least one predetermined frequency, and decode said one or more responses to a unique tag ID.

15. The tag system of claim 14, wherein:
said RF energy comprises multiple excitation frequencies, and wherein said RFID reader is to observe said one or more responses at said multiple excitation frequencies, and decode said responses to a unique tag ID.

16. The tag system of claim 15, wherein the RFID reader is further configured to spatially separate and segment environmental clutter after providing said 3-D position information.

17. The tag system of claim 14, wherein the RFID reader further comprises multiple reader antennas, and wherein said RFID reader is configured to spatially resolve said responses from said tag in order to provide 3-D position information for said tag.

18. The tag system of claim 14, wherein said reader is configured to operate in at least one mode selected from the group consisting of monostatic, bistatic, and multistatic modes, to interrogate said tag at one or more frequencies of interest.

19. The tag system of claim 14, wherein said response comprises a response selected from the group consisting of: a unique phase, a unique amplitude, and combinations of unique phase and amplitude.

20. A radio frequency identification (RFID) tag system comprising:
a passive radio frequency (RF) identification (pRFID) tag comprising:
a circuit pattern configured to have a unique response for each one of a plurality of predetermined frequencies of RF energy when illuminated by a spectrum of said RF energy; and
an RFID reader to illuminate said tag with said spectrum of RF energy, observe responses at multiple excitation frequencies, and decode said responses to a unique tag ID, wherein said response is a spectral response observed by a qth antenna of the RFID reader at a pth frequency according to a measurement defined by:

$$S_q(f_p) = \sum_{k=1}^{M} A_{qk} H_k(f_p) \exp\left(-j\frac{2\Pi f_p}{c} R_{qk}\right)$$

where $A_{qk}$ is an arbitrary gain/phase related to a physical channel between the tag and the reader, $R_{qk}$ is a round-trip range (monostatic or bistatic) from the reader to the tag to the reader, which is a function of a known transmitter position $t_q$, a known receiver position $r_q$, and an unknown tag position $x_k$, and $H_k(f_p)$ represents a response of a kth tag to a pth frequency, wherein in monostatic operation, the transmitter and receiver are collocated, and wherein said measurement is to be repeated for all antennas (for all q) and for all frequencies (for all p).

21. A radio frequency identification (RFID) tag system comprising:
a passive radio frequency (RF) identification (pRFID) tag comprising:
a circuit pattern that is configured to provide a unique linear/nonlinear response when the tag is illuminated by a particular frequency of RF energy; and
an RFID reader to illuminate said tag with said spectrum of RF energy, observe responses at multiple excitation frequencies, and decode said responses to a unique tag ID, wherein said response is a spectral response observed by a qth antenna of the RFID reader at a pth frequency according to a measurement defined by:

$$S_q(f_p) = \sum_{k=1}^{M} A_{qk} H_k(f_p) \exp\left(-j\frac{2\Pi f_p}{c} R_{qk}\right)$$

where $A_{qk}$ is an arbitrary gain/phase related to a physical channel between the tag and the reader, $R_{qk}$ is a round-trip range (monostatic or bistatic) from the reader to the tag to the reader, which is a function of a known transmitter position $t_q$, a known receiver position $r_q$, and an unknown tag position $x_k$, and $H_k(f_p)$ represents a response of a kth tag to a pth frequency, wherein in monostatic operation, the transmitter and receiver are collocated, and wherein said measurement is to be repeated for all antennas (for all q) and for all frequencies (for all p).

* * * * *

UNITED STATES PATENT AND TRADEMARK OFFICE
CERTIFICATE OF CORRECTION

PATENT NO. : 7,988,055 B2  
APPLICATION NO. : 11/336622  
DATED : August 2, 2011  
INVENTOR(S) : Garber et al.

It is certified that error appears in the above-identified patent and that said Letters Patent is hereby corrected as shown below:

Column 6, line 46, in Claim 1, delete "at least one" and insert -- at at least one --.

Column 7, line 30, in Claim 14, delete "at least one" and insert -- at at least one --.

Signed and Sealed this  
Twentieth Day of March, 2012

David J. Kappos  
*Director of the United States Patent and Trademark Office*